United States Patent [19]

Lowery

[11] 3,844,390
[45] Oct. 29, 1974

[54] SINGLE SPRING, BIDIRECTIONAL, ANTI-OVERTRAVEL CLUTCH

[75] Inventor: Robert D. Lowery, Willowick, Ohio

[73] Assignee: The Marquette Metal Products Company, Cleveland, Ohio

[22] Filed: June 6, 1973

[21] Appl. No.: 367,394

[52] U.S. Cl................ 192/26, 192/33 C, 192/81 C
[51] Int. Cl............................................ F16d 13/08
[58] Field of Search.................... 192/26, 33 C, 81 C

[56] References Cited
UNITED STATES PATENTS

| | | | |
|---|---|---|---|
| 2,968,380 | 1/1961 | Sacchini et al................... | 192/81 C |
| 2,984,325 | 5/1961 | Tomko et al...................... | 192/81 C |
| 3,373,851 | 3/1968 | Baer................................. | 192/26 X |
| 3,545,580 | 12/1970 | Baer................................. | 192/26 |
| 3,648,810 | 3/1972 | Weatherby......................... | 192/26 |
| 3,726,372 | 4/1973 | Baer et al. ......................... | 192/26 |

Primary Examiner—Allan D. Herrmann
Attorney, Agent, or Firm—Arthur Frederick

[57] ABSTRACT

The bidirectional spring clutch comprises a single coil spring having a plural-step set of coils in which one end of the spring is connected to a control sleeve and in interference fit with input drum so that torque is transmitted in one direction of input rotation via the spring, the control sleeve being rotatively carried by the spring. When rotation of the control sleeve is arrested, disengagement is effected by disconnection of the spring with the input drum. In the opposite direction of rotation, torque load is transmitted via the interference fit of the spring, connection with the sleeve and a connecting means between the sleeve and output drums. In torque transmission in said opposite direction, over-travel of the output drum relative to the input drum is stopped by coaction of the connecting means and control sleeve which causes rotation of the control sleeve in a direction to establish an interference fit of the spring with the output drum thereby locking the output drum to the input drum through the spring.

12 Claims, 7 Drawing Figures

PATENTED OCT 29 1974 3,844,390
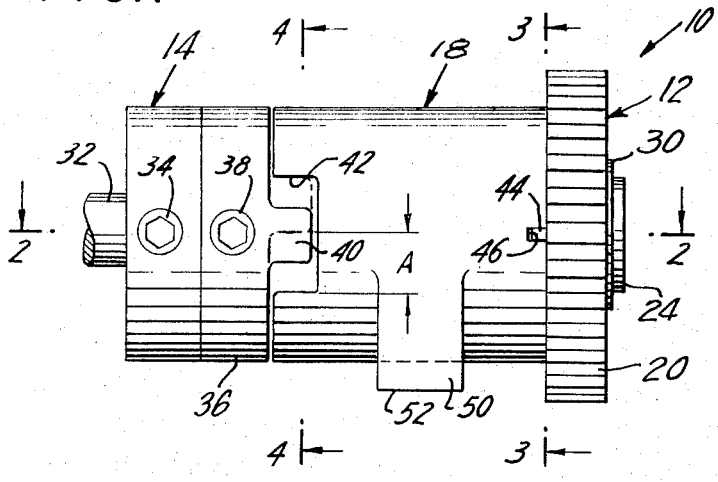
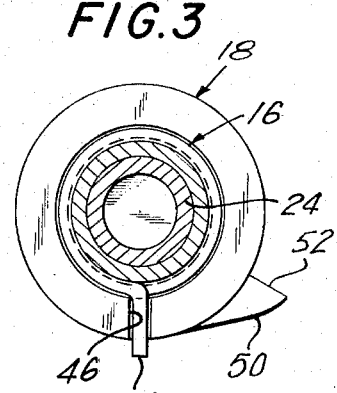
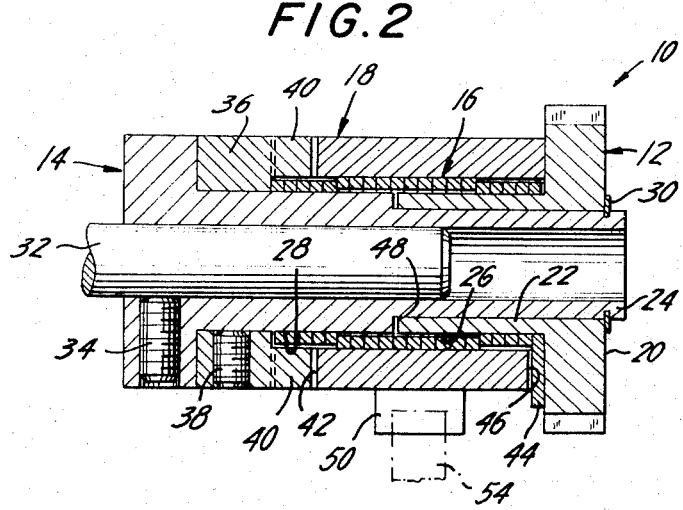
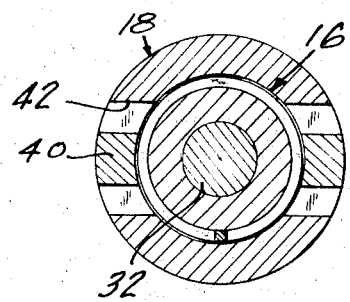
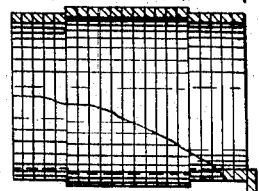
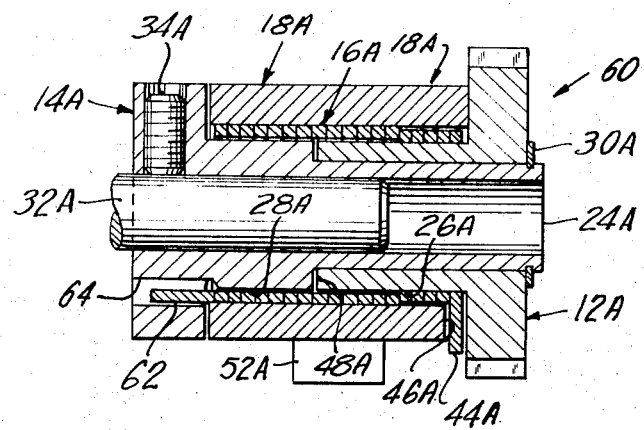
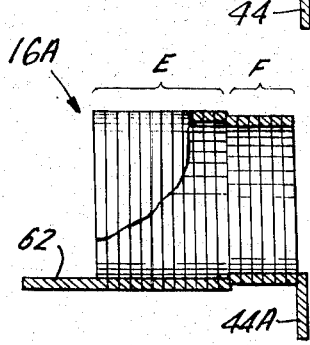

SINGLE SPRING, BIDIRECTIONAL, ANTI-OVERTRAVEL CLUTCH

This invention relates to spring clutches and, more particularly, to a bidirectional spring clutch assembly having means for stopping rotational overtravel of the output clutch member relative to the input clutch member in both directions of torque transmission.

BACKGROUND OF THE INVENTION

Heretofore, to provide a spring clutch assembly which was capable of transmitting rotation in two directions and disengageable in one of those directions of rotation, the assembly required two or more springs. Such conventional bidirectional clutch assemblies are exemplified in the U.S. Pat. Nos. to Starkey 2,458,441; Pepper, 2,603,324; Gorske et al., 2,622,450; Hungerford, Jr., 2,946,417; Magill et al., 2,947,278; Moulton 3,051,445; and Sacchini, 3,361,235. Also, heretofore, single spring clutch assemblies required a second spring or a one way roller type clutch mechanism between the input and output clutch members of the clutch assembly to prevent overrun or overtravel of the output clutch member relative to the input clutch member in one of the directions of rotation.

Accordingly, an object of this invention is to provide a bidirectional spring clutch assembly having only one spring and capable of disengagement in one direction of rotation and capable of stopping overrun of the output member relative to the input member in both directions of torque transmission.

A feature of this invention is the coaction of the single coil spring and control sleeve or collar whereby torque load is transmitted from an input member to an output member in one direction of rotation via the spring and in the opposite direction of rotation transmission of torque is effected through the control sleeve.

SUMMARY

It is therefore contemplated by the present invention to provide a bidirectional spring clutch assembly which comprises a helical spring arranged to surround coaxially disposed input and output members or drums and having plural sets of coils with one set in interference fit with the input drum and another set of coils connected to the output drum so as to transmit torque load from the input drum to the output drum in one direction of rotation (counter to the direction of the wind of the helical spring). A sleeve is coaxially disposed to surround the helical spring and is in torque transmission contact at one end to the latter so that, when rotation of the sleeve is arrested by stop means, the said one set of coils is caused to expand in diameter and disengage from the input drum and thereby interrupt transmission of rotation. A connecting means is provided for rotatively connecting the output drum to the sleeve to provide for transmission of torque from the input drum to the output drum in the direction of rotation opposite the one direction, via the sleeve, and prevent rotative override of the output drum with respect to the input drum by causing, when override tends to occur, contraction of the helical spring coils and engagement of the coils with the output drum.

In one embodiment of this invention, the connecting means comprises a tang or lug and groove or notch which coact to rotatively interconnect the sleeve and output drum. The lug and groove are sized so that small relative rotative movement can occur between the lug and notch. This small lost motion between the tang and groove is provided to permit, in a direction opposite the one direction of rotation, energization of the helical spring or, expressed in another way, permit rotation of the sleeve and prevent interruption of the interference fit of the spring with the input drum.

In another embodiment of this invention the connecting means is a spring, toe or tang coacting with a recess in the output drum. In this embodiment, rotation in a direction opposite the one direction effects transmission of torque from the input drum to the output drum via the sleeve and the spring.

BRIEF DESCRIPTION OF THE DRAWINGS

The invention will be more fully understood from the following detailed description thereof when considered in connection with the accompanying drawing wherein two embodiments of the invention are illustrated by way of example and in which:

FIG. 1 is a view in elevation of the spring clutch assembly according to this invention;

FIG. 2 is a longitudinal view in cross section taken substantially along line 2—2 of FIG. 1;

FIG. 3 is a transverse cross-sectional view taken along line 3—3 of FIG. 1 and rotated 90°;

FIG. 4 is a transverse cross-sectional view taken along line 4—4 of FIG. 1;

FIG. 5 is a view of the plural step helical spring in the unloaded state employed in the spring clutch shown in FIGS. 1 to 4;

FIG. 6 is a cross-sectional view similar to FIG. 2 showing a spring clutch assembly according to another embodiment of this invention; and FIG. 7 is a cross-sectional view of the helical spring in its unloaded state employed in the spring clutch assembly shown in FIG. 6.

DESCRIPTION OF THE PREFERRED EMBODIMENTS

Now referring to the drawings and more specifically to FIGS. 1 to 5, the reference number 10 designates a spring clutch assembly according to a first embodiment of this invention. As best shown in FIGS. 1 and 2, spring clutch assembly 10 basically comprises an input member or drum 12 and an output member or drum 14 coaxially arranged relative to each other and interconnected by a helical spring 16, a control collar or sleeve 18 being disposed to surround the spring.

The input drum 12 has a gear portion 20 or other means for rotational connection to a source of rotary power (not shown). The input drum also has a tubular portion 22 which is supported for rotation on a reduced diameter portion 24 of output drum 14. The outer peripheral surface 26 of hub portion 22 forms a clutch surface which is coextensive with a cylindrical clutch surface 28 on output drum 14. To secure input drum 12 against axial movement, a split washer 30 is fitted in an annular groove in the portion 24 of output drum 14.

The output drum 14 is secured to an output shaft 32 by means of a set screw 34 or other suitable means, such as splines, keys, or the like. While an output shaft is shown, output drum 14 may be provided with a gear, pulley or other means for transmitting rotation of an output member without departing from the scope and spirit of this invention. The output drum 14 also includes a stop collar 36 which is secured to clutch surface 28 by at least one set screw 38 or other suitable means well known to those skilled in the art. The stop collar 36 has one or more tangs or lugs 40, two being shown in the drawings disposed diametrically opposite each other. Each of the lugs axially extends into a groove or notch 42 formed in the adjacent end of sleeve 18 (hereinafter referred to as the "output end" of the sleeve). Each lug 40 and its associated notch 42 are so sized that a small relative rotary motion between output drum 14 and sleeve 18 can occur. This relative angular movement is represented in FIG. 1 by the letter A.

The lugs 40 and notches 42 constitute a "lost-motion" connecting means between sleeve 18 and output drum 14, the purpose and function of such being explained fully hereinafter. Obviously, stop collar 36 may be an integral part of output drum 14 rather than a separate element without departure from the scope and spirit of this invention. Also, without departing from the scope and spirit of this invention, tangs 40 may be part of sleeve 18 instead of collar 36, while notches 42 can then be in collar 36 rather than in sleeve 18 as shown.

The helical spring 16, as best shown in FIG. 5, has three sets of coils of different diameters, the endmost sets of coils being designated B and D and the middle set designated C. When helical spring 16 is incorporated in spring clutch assembly 10, it is preloaded to establish an interference fit of coil sets B and D with clutch surfaces 28 and 26 of output drum 14 and input drum 12, respectively, for reactional and self-energization of the spring upon rotation of input drum 12 in one direction, as for example, counter-clockwise with a right hand wound spring and as viewed from the right in FIGS. 1 and 2. The middle set of coils C is of larger diameter than coil sets B and D, but not necessarily enough to be out of contact with clutch surfaces 28 and 26. The coil set C may also be in reference fit with clutch surfaces 28 and 26 but to a lesser magnitude than coil sets B and D. This construction of spring 16 functions to provide for contraction of the coils of coil set C to thereby effect a rigid connection between the input and output drums through the spring upon a small rotative movement of input drum 12 in one direction (i.e., counter-clockwise). The spring 16 has a radially projecting tank or toe end portion 44 which fits within a notch 46 in the end of sleeve 18 (hereinafter referred to as the "input end") opposite from the output end of the sleeve and, therefore, sleeve 18 is rotated when coil set D is rotatively connected to input drum 12. The middle coil set C axially spans the crossover gap 48 between the input and output drums.

The sleeve 18, in addition to notches 42 and 46, has a detent 50 which provides a stop shoulder 52 projecting radially from the outer peripheral surface of sleeve 18. This shoulder 52 coacts with a stop member 54 (shown in broken lines in FIG. 2), as for example a solenoid actuated element, for selectively arresting rotation of sleeve 18 when the input drum is rotating in the one direction, as for example counter-clockwise when the spring is right-hand wound.

In operation of spring clutch assemsbly 10, assuming that helical spring 16 is right-hand wound, driving input drum 12 in a counter-clockwise direction by a source of rotary power (not shown) causes torque load to be transmitted to the output drum via spring 16. The counter-clockwise rotation of input drum 12 causes coil set D to be energized by reason of its frictional engagement with the clutching surface 26 and to wrap-down (contraction of coils) and further grip such surface. Thus, torque load is transmitted from the spring to output drum 14 by reason of the grip of coil set B on clutching surface 28 of output drum 14. Since the direction of rotation is such as to cause contraction of coil set B, the spring does not override the output drum. To interrupt torque transmission, stop member 54 is actuated so as to engage shoulder 52 of detent 50. When rotation of sleeve 18 is arrested, the coil set D is caused to expand and thus allow clutching surface 26 of input drum 12 to override spring 16. This deenergization of spring 16 is achieved by reason of the connection of spring 16, at toe 44, with sleeve 18. By holding toe 44 from rotation, the rotational inertial force of output drum 14 and output load thereon causes coil set D to expand. To prevent inadvertent deenergization of spring 16 by reason of resistance to rotation imposed, via lugs 40 and notches 42, on sleeve 18 by the load on the output drum, the lugs and notches provide lost motion between the sleeve and output drum and thereby keeps the lugs from engaging the notches and arresting rotation of sleeve 18.

When input drum 12 is initially driven in the reverse direction, namely, clockwise, the coil set D rotates with the input drum which rotation also rotates sleeve 18 by reason of its connection with the spring at toe 44. This reverse rotation tends to expand the coils of spring 16 including coil set C until sleeve 18 is rotated to bring notches 42 into abutment against lugs 40 (angle A at 0°) to thus prevent further expansion of the coils of coil set C. Also, the abutment of the lugs and notches prevents torque transmitting disengagement of coils of coil set D from input drum 12 because the resistance to rotation or load imposed on sleeve 18 by reason of the abutment of lugs 40 against the walls of notches 42 effects a force on coil set D in a counterclockwise direction which causes the coil set D to tightly grip clutching surface 26 of input drum 12. This function insures the maintenance of a drivable connection between input drum 12 and coil set D in the reverse direction of rotation.

In the event output drum 14 overtravels input drum 12, when torque is being transmitted in the clockwise direction, coil set C of spring 16 contracts to grip clutch surfaces 26 and 28 of input drum 12 and output drum 14, respectively, so that output drum 14 is rigidly connected to input drum 12, via spring 16. This rotative coupling is achieved because overtravel of the output drum 14 has the effect of changing, with respect to the spring, the relative direction of rotation from clockwise to counterclockwise. After overtravel is prevented and angle A is again 0°, continued rotative drive of the input drum in the reverse direction (clockwise) will effect transmission of rotation again through spring tang 44, sleeve 18, the interconnection between tangs 40 and notches 42, and collar 36 to output drum 14. The output drum through lugs 40 imposes on sleeve 18 a force which acts through toe 44 of spring 16 to energize coil set D and cause the coil set D to contract and grip input drum 12 and thereby effect the transmission of torque from input drum 12 to output drum 14.

In FIGS. 6 and 7 a second embodiment of this invention is disclosed which provides a bidirectional spring clutch assembly 60 which essentially differs from spring clutch assembly 10 shown in FIGS. 1 to 5 in that stop collar 36 of assembly 10 is omitted and the helical spring is directly connected to the output drum. In view of the similarity of spring clutch assemblies 10 and 60, parts of spring clutch assembly 60 corresponding to like parts of spring clutch assembly 10 will be designated by the same reference number with the suffix A added thereto.

As best shown in FIG. 7 helical spring 16A comprises two sets of coils E and F instead of three sets of coils of spring 16 and has an axially projecting tang or toe portion 62 which engages an opening 64 in output drum 14A. As is provided in spring clutch assembly 10, spring 16A is preloaded so that coil set F is in interference fit with clutching surface 26A of input drum 12A. Thus, assuming spring 16A to be right hand wound, torque in the counter-clockwise direction, is transmitted from input drum 12A to spring 16A and thence from spring 16A to output drum 14A by reason of the wrapdown of coil set E on clutching surface 28A of the output drum. Interruption of torque transmission is achieved by arresting rotation of control sleeve 18A and thereby effect expansion of the coils of set F and disengagement thereof from input drum 12A. In the clockwise direction of rotation of input drum 12A torque load is transmitted to output drum 14A through control sleeve 18A and the tang 62 of spring 16A. While clockwise rotation of input drum 12A tends to expand coil set F, complete disengagement does not occur before coil set E engages the inner peripheral surface of control sleeve 18A so that torque is transmitted from the spring by tang 62 to output drum 14A. Overtravel in the reverse or clockwise direction, assuming a right hand wound spring 16A, is prevented in spring clutch assembly 60 in a manner similar to spring clutch assembly 10. When output drum 14A overtravels input drum 12A such relative motion of input and output drums and between tangs 62 and 44A, causes spring coils E to wrapdown on clutching surface 28A of output drum 14A. This locks input drum 12A, through the spring to output drum 14A.

It is now believed readily apparent that the present invention provides a spring clutch assembly, having a single helical spring, which assembly is capable of bidirectional rotation and in one direction of rotation, disengageable by arresting rotation of a control sleeve. The spring clutch mechanism also prevents overrun of the output drum relative to the input drum without the need for another spring or roller clutch or brake mechanism.

Although, two embodiments of the invention have been illustrated and described in detail, it is to be expressly understood that the invention is not limited thereto. Various changes can be made in the arrangement of parts without departing from the spirit and scope of the invention as the same will now be understood by those skilled in the art.

What is claimed is:

1. A bidirectional spring clutch comprising:
   a. an input and an output drum supported for rotation in coaxial relationship to each other;
   b. a coil spring disposed to surround said input and output drums and having a plural step set of coils;
   c. one set of coils being preloaded so as to be in interference fit with the input drum;
   d. a sleeve surrounding the coil spring and being connected to the end portion of said coil spring adjacent the one set of coils and the input drum;
   e. said coil spring being connected to said sleeve so that, upon rotation of the input drum in one direction and arresting rotation of said sleeve, the one set of coils disengages from the input drum; and
   f. connecting means rotatively connecting said sleeve to said output drum so that when there is rotation of the input drum in a direction opposite said one direction the output load from the output drum is transmitted through the connection between the sleeve and coil spring at the input drum to thereby exert a force on said one set of coils in said one direction and prevent an interruption of said interference fit of said one set of coils with the input drum so that transmission of rotation is effected from the input drum via said one set of coils of the coil spring and said sleeve to the output drum in a direction opposite said one direction;
   g. said connecting means functioning upon overtravel of said output drum relative to said input drum to cause another set of coils of the coil spring to contract and grip said input and output drums and thereby terminate said overtravel.

2. The apparatus of claim 1 wherein the connecting means includes a coacting tang and groove dimensioned to provide a small relative regular movement between the output drum and the sleeve.

3. The apparatus of claim 1 wherein the connecting means includes a tang end portion of said coil spring receivable in a recess in the output drum.

4. The apparatus of claim 1 wherein said coil spring has three sets of coils and wherein said endmost sets of coils are in interference fit with the input and output drums and the middle set of coils which upon overtravel of said output drum in the direction opposite of said one direction contract upon output drum and input drum and thus stop such overtravel.

5. The apparatus of claim 1 wherein said connecting means coacts through said sleeve with the coil spring so that upon overtravel of the output drum relative to said input drum, the effective rotation with respect to the spring changes to rotation in said one direction.

6. A spring clutch comprising:
   a. an input drum supported for rotation;
   b. an output drum supported for rotation in coextensive axial relationship with the input drum;
   c. a coil spring disposed to surround said input and output drums and comprising at least a first portion and a second portion;
   d. a sleeve surrounding said coil spring;
   e. first means connecting one end of said coil spring at its first portion to said sleeve;
   f. said first portion of said coil spring being preloaded to be in interference fit with the input drum so that upon rotation in one direction of the input drum the coil spring is energized to grip the input and output drums and thereby transmit rotation to the output drum;
   g. said sleeve having means for arresting its rotation in said one direction so that, when said sleeve is held against rotation, the rotative engagement between the first portion of the spring clutch and the input drum is discontinued and transmission of rotation from the input drum to the output drum is interrupted;

h. second connecting means for rotatively interconnecting said sleeve and said output drum upon rotation of said input drum in a direction opposite said one direction so that said first means, via the output load on said sleeve, prevents interruption of the interference fit between said first portion of the coil spring and thereby effect transmission of rotation from the input drum to said output drum, via the coil spring and said sleeve, in said direction opposite said one direction; and i. said second means coacting with said second portion of said coil spring in the direction opposite said one direction of rotation to effect, upon overrun of the output drum, energization of said second portion of the coil spring and contraction of the coils thereof to grip the output drum and thus rotatively lock the output drum to the input drum through the coil spring.

7. The apparatus of claim 6 wherein said first means is a tang on the coil receivable in an opening in one end of said sleeve.

8. The apparatus of claim 6 wherein said coil spring has a plural stepped set of coils and wherein said first and second portions of said coil spring comprises two of the sets of coils.

9. The apparatus of claim 6 wherein said coil spring has three sets of coils and wherein said first and second portions are two of said sets located at opposite ends of the coil spring and are preloaded to be in interference fit with the input drum and output drum and the set of coils between said end sets of coils is of a lesser magnitude of preloading.

10. The apparatus of claim 6 wherein said second connecting means comprises a lug and groove means rotatively interconnecting the output drum and sleeve.

11. The apparatus of claim 10 wherein said lug and groove means permits limited relative rotation between the sleeve and output drum which is insufficient to interrupt the interference fit of the first portion of the coil spring on the input drum in said direction of rotation opposite said one direction.

12. The apparatus of claim 6 wherein said second connecting means is an end portion of the coil spring opposite said first means engaging rotatively the output drum.

* * * * *

UNITED STATES PATENT OFFICE
CERTIFICATE OF CORRECTION

Patent No. 3,844,390                   Dated   October 29, 1974

Inventor(s)    Robert D. Lowery

It is certified that error appears in the above-identified patent and that said Letters Patent are hereby corrected as shown below:

IN THE SPECIFICATION:

Column 2, line 65, after the word rotation the word "of" should read --to--.
    Column 3, line 39, the word "reference" should be --interference--.
    line 47, the word "tank" should read --tang--.
    line 63, the word "assemsbly" should be --assembly--

IN THE CLAIMS:

Claim 2, Column 6, line 28, the word "regular" should read --angular--.
Claim 7, Column 7, line 20, after the word "coil", add the word --spring--.

Signed and sealed this 14th day of January 1975.

(SEAL)
Attest:

McCOY M. GIBSON JR.              C. MARSHALL DANN
Attesting Officer                Commissioner of Patents